(12) United States Patent
Quan

(10) Patent No.: US 8,526,794 B2
(45) Date of Patent: Sep. 3, 2013

(54) METHOD AND APPARATUS FOR SYNTHESIZING A COPY PROTECTION OR CONTENT CONTROL SIGNAL WITH IMPROVED PLAYABILITY OF A TV SET

(75) Inventor: Ronald Quan, Cupertino, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 1211 days.

(21) Appl. No.: 12/221,817

(22) Filed: Aug. 6, 2008

(65) Prior Publication Data

US 2009/0052866 A1   Feb. 26, 2009

Related U.S. Application Data

(60) Provisional application No. 60/965,704, filed on Aug. 22, 2007.

(51) Int. Cl.
H04N 9/80 (2006.01)
H04N 9/68 (2006.01)
H04N 9/79 (2006.01)
H04N 7/167 (2011.01)

(52) U.S. Cl.
USPC .................. 386/252; 386/304; 380/203

(58) Field of Classification Search
USPC ......... 380/202, 203, 201; 386/252, 254–255, 386/257, 304; 726/26–33
See application file for complete search history.

(56) References Cited

U.S. PATENT DOCUMENTS

| | | | |
|---|---|---|---|
| 4,163,253 A * | 7/1979 | Morio et al. | 380/204 |
| 4,631,603 A | 12/1986 | Ryan | |
| 4,819,098 A | 4/1989 | Ryan | |
| 4,907,093 A | 3/1990 | Ryan | |
| 5,315,448 A | 5/1994 | Ryan | |
| 5,583,936 A | 12/1996 | Wonfor et al. | |
| 5,625,691 A | 4/1997 | Quan | |
| 5,784,523 A | 7/1998 | Quan et al. | |
| 6,188,832 B1 | 2/2001 | Ryan | |
| 6,381,747 B1 | 4/2002 | Wonfor et al. | |

(Continued)

FOREIGN PATENT DOCUMENTS

| | | |
|---|---|---|
| EP | 1 480 455 A1 | 11/2004 |
| WO | WO 00/13413 | 3/2000 |
| WO | WO 2004/004346 | 1/2004 |
| WO | WO 2005/039176 A1 | 4/2005 |

OTHER PUBLICATIONS

International Search Report for PCT/US2008/009473 mailed Jan. 7, 2009, 1 page.

(Continued)

Primary Examiner — Philip Chea
Assistant Examiner — Trong Nguyen
(74) Attorney, Agent, or Firm — George B. Almeida

(57) ABSTRACT

Playability of a copy protected video signal is improved by reducing the darkening and or venetian blind effects which tend to cause artifacts in a video signal display. To this end, the copy protection signal includes automatic gain control (AGC) signals or pulses in video lines in a portion of the active or viewable video field or frame, wherein the AGC pulses comprise non similar AGC signals from one video line to another video line. The dis-similar AGC pulses may include pulses which are deleted, blanked, attenuated, pulse width modified, modulated, etc. In addition, selected sync pulses may be pulse width, amplitude and or position modified.

31 Claims, 4 Drawing Sheets

(56) References Cited

U.S. PATENT DOCUMENTS

| | | |
|---|---|---|
| 6,516,132 B1 | 2/2003 | Wrobleski et al. |
| 6,600,873 B1 | 7/2003 | Brill et al. |
| 6,690,880 B1* | 2/2004 | Rinaldi .................. 386/252 |
| 6,836,549 B1 | 12/2004 | Quan et al. |
| 7,039,294 B2 | 5/2006 | Quan |
| 7,050,698 B1 | 5/2006 | Quan |
| 7,085,380 B2 | 8/2006 | Quan |
| 7,236,683 B2 | 6/2007 | Quan |
| 2003/0091335 A1* | 5/2003 | Quan ........................ 386/94 |
| 2005/0084102 A1 | 4/2005 | Hollar |
| 2005/0117749 A1* | 6/2005 | Quan ........................ 380/201 |
| 2005/0185100 A1 | 8/2005 | Akiyama |
| 2006/0093140 A1 | 5/2006 | Quan |
| 2009/0202215 A1* | 8/2009 | Tan ........................ 386/34 |

OTHER PUBLICATIONS

Supplementary Partial European Search Report for Application No. EP 08 79 5097, completed on Apr. 12, 2011, 1 page.

* cited by examiner

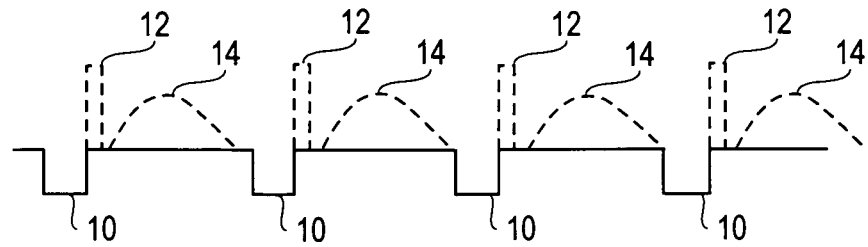
FIG. 1 (Prior Art)
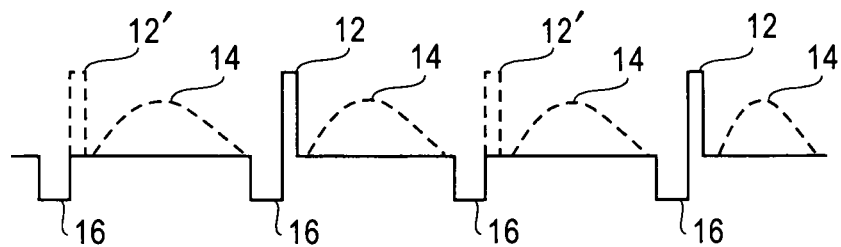
FIG. 2A (N=2)
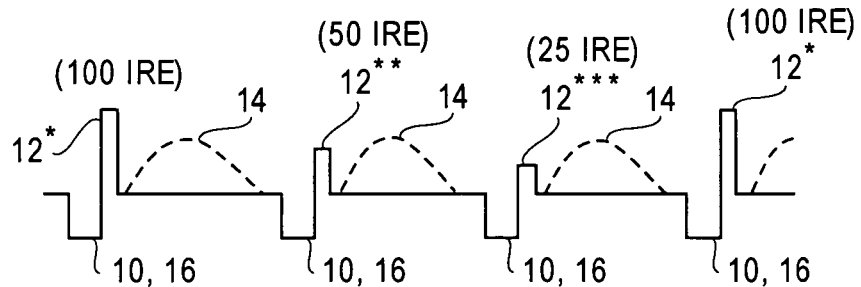
FIG. 2B
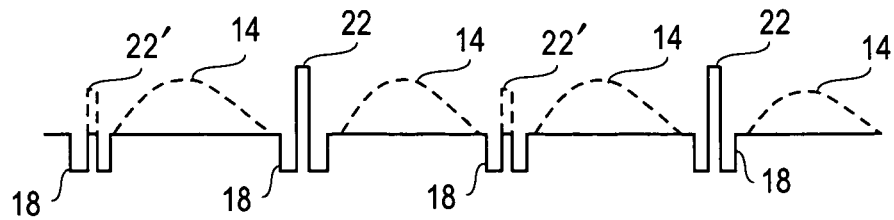
FIG. 3 (N=2)

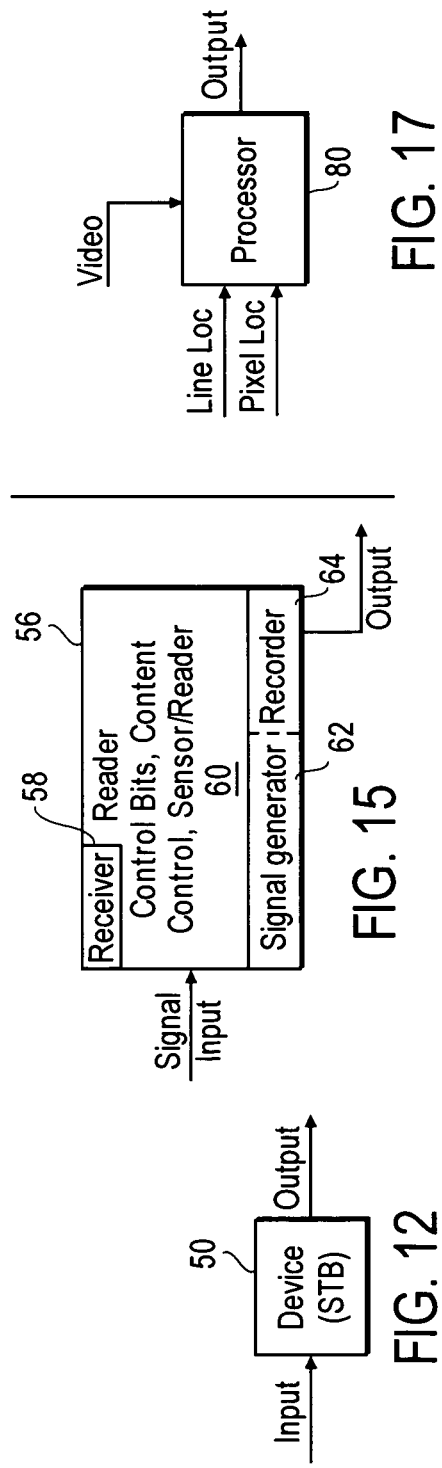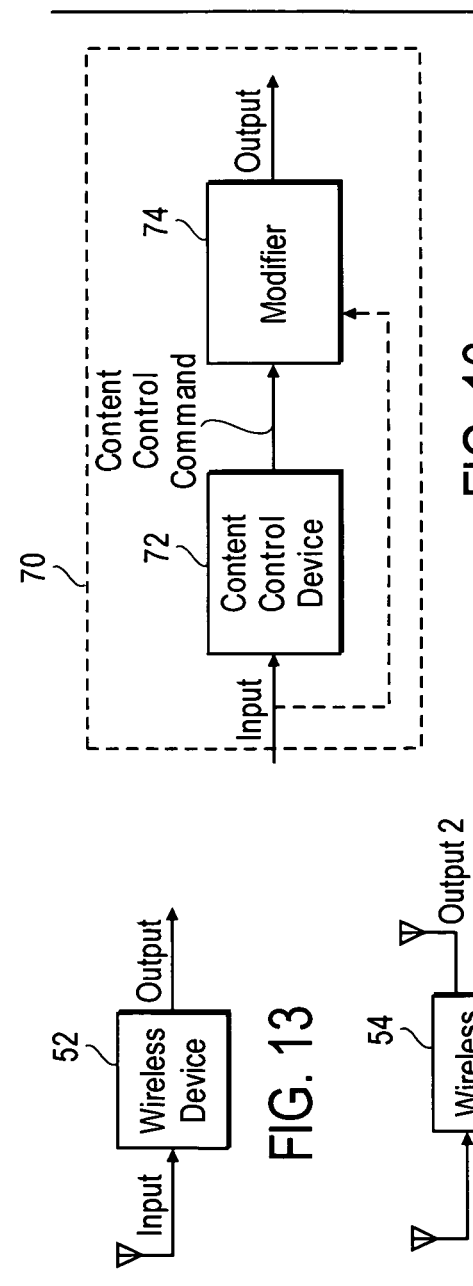

US 8,526,794 B2

METHOD AND APPARATUS FOR SYNTHESIZING A COPY PROTECTION OR CONTENT CONTROL SIGNAL WITH IMPROVED PLAYABILITY OF A TV SET

CROSS REFERENCE TO RELATED APPLICATION

This application claims the benefit of U.S. Provisional Application Ser. No. 60/965,704 filed Aug. 22, 2007.

FIELD OF THE INVENTION

The present invention is related to video copy protection signals that generally produce a playable picture when the program video signal is coupled to a television monitor but which cause a recorder to provide a degraded program video signal.

BACKGROUND OF THE INVENTION

Previous attempts for adding an automatic gain control (AGC) pulse or back porch pulse in a horizontal blanking interval (e.g., a portion of the back porch) has caused various degrees of playability artifacts.

For example, the copy protection system disclosed in U.S. Pat. No. 4,163,253 to Morio, adds back porch AGC pulses in a consecutive manner during the active video field. This causes a noticeable darkening effect on many television sets that utilize back porch sample clamping circuits. For example, see the AGC pulses 12 shown in dotted lines in FIG. 1.

A variation of the Morio patent adds the back porch AGC pulses in a non-consecutive manner or in clusters (see U.S. Pat. No. 4,819,098 to Ryan). Adding the back porch signals in one out of every N television lines in the active television field, provides an improvement in reducing the darkening effect experienced in the system of the Morio ('253) patent. However, in some television sets the one out of every N lines system disclosed in the Ryan '098 patent causes a trace of darkening to be displayed on the one out of N lines, which causes a "venetian blind" (darkening) effect.

Similarly, adding AGC pulses in a cluster of television lines also decreases the darkening effect experienced by the system disclosed in the Morio ('253) patent. To this end, the clusters of the AGC pulses should be located away from television lines in the active field portion or viewable area of the video field. This restricts the number of clusters of AGC pulses which can be used.

Accordingly, adding back porch pulses in a 1/N manner seems to be successful in reducing the overall darkening effect of the Morio ('253) patent apparatus, but can lead to a venetian blind effect. This venetian blind effect is a darkening of every N line. For example, if the back porch pulses are to be added to one out of every ten lines, then for some displays every tenth line will exhibit a slight amount of darkening. This venetian blind effect may be more noticeable in newer television sets that have analog to digital converters and or digital processing.

A further alternative to the Morio ('253) and Ryan ('098) patents, is a system which adds a lowered back porch signal to a portion of the back porch of selected television lines to partially offset or to substantially cancel darkening effects caused when AGC pulses are added to the back porches. (For example, see U.S. Pat. No. 6,188,832 to Ryan.) However, the lowered back porch signal may cause some television displays to show an overly bright picture. So this solution can lead to a "brightening" artifact in some television sets.

Another copy protection system is disclosed in World Patent WO 2004/004346 A1 to Tan which shows the addition of an AGC pulse in each line of the video field throughout the visible or active television lines. These AGC pulses are added preferably prior to a color burst signal to avoid the darkening effects of the Morio apparatus. However, although the Tan process causes less darkening than the Morio process, noticeable darkening results in some television displays as well. See the AGC pulses of FIG. 2A, which also illustrates "narrowed" sync pulses 16 with the AGC pulses 12 following immediately from the trailing edge of the narrowed horizontal sync pulses.

SUMMARY OF THE INVENTION

An object of the present invention is to produce a video copy protected signal that causes an automatic gain control effect on a video cassette recorder (VCR) or video device, utilizing an automatic gain control amplifier (AGC amplifier), while improving on playability in a television monitor (e.g., a reduced venetian blind effect or a reduced darkening effect).

Another object of the invention is to improve further on decreasing the darkening effects experienced by the systems of the U.S. Pat. Nos. 4,163,253, 4,819,098 and or WO 2004/004346A1, of previous mention.

A further object of the invention is to improve on time base instability in a television display. Time base instability is sometimes caused by the adding of a positive level shifting pulse in the horizontal blanking interval (HBI) that includes shifting a portion of the sync pulse toward blanking level or toward a gray or white level.

Yet another object of the invention is to improve on decreasing the darkening effects experienced by a video signal that is treated or provided with two or more negative going pulses in selected horizontal blanking intervals (HBIs) or areas located in the HBI and its vicinity.

Another object is to improve on time base stability for a television display with a video signal that may include more than one sync-like pulse (e.g., −200 to −320 millivolts from blanking level, with each pulse having a pulse width that can be sensed/affected by any video device's timing circuit; e.g., a sync separator and or lock oscillator). Multiple sync-like pulses within a horizontal timing interval can lead to display tearing/instabilities of some displays, such as displays with digital signal processing, or on certain flat screen monitors.

Yet another object of the invention is to include the use of multiple sync-like pulses to provide a content control command for a content control system.

Still another object of the invention may include method and apparatus for sensing or reading sequences of AGC signals to provide one or more commands in a content control system. For example the start and/or termination (line) of an AGC pulse or the sensing of dissimilar AGC pulses may define a content control command.

It is to be understood that the invention may include one or more of the following configuration or concept.

1) Modification of selected color burst signal(s). For example, one or more widened or shortened color burst envelope.

2) Modification of selected horizontal blanking intervals. For example, one or more widened or narrowed horizontal blanking interval.

3) Filling in of video lines that normally have no AGC pulses (or weak AGC pulses) with AGC pulses with a selected intermediate value, to reduce a venetian blind effect to improve playability. For example if N>=3, 1 in N lines will have an AGC pulse and the other lines that would not have an AGC pulse may have AGC pulses of pre-selected value(s). For example, the values may start at 80% white and descend in energy until the next Nth AGC pulse occurs. For another example, if N=6, the AGC pulse of every Nth line may be set to about peak white, whereupon the AGC pulses of (each of the) other lines may be set to a value within a range from 80% to 20% white. Of course, other N values and or ranges are possible.

By way of a general description, an embodiment of the invention employs a dissimilar AGC signal in one or more portion of an active field, from one television line to another. For example, one AGC pulse on a television line may have an amplitude of X millivolts and a duration of X1, and another television line may have an amplitude of Y millivolts and a duration of Y1. In another example, every P line may have characteristics of X followed by Q lines of characteristics Y. Of course there can be more than X or Y type characteristics (e.g., A, B, C . . . etc. characteristics).

Another general description of an embodiment of the invention provides any two dissimilar AGC pulses (a zero value AGC pulse may be included) within an active field. For example, AGC pulses may be varied in amplitude and or pulse width in any number of combinations or sequences. Ergo, a selected number of AGC pulses in a portion of an active field may be of multiple values (e.g., >=2 values).

For example, one in M lines may have a smaller amplitude AGC signal than the AGC signals in the (M−1) lines (or vice versa).

An alternative general description of another embodiment of the invention provides that the AGC and or sync pulses are modulated/modified. Preferably the modulation/modification of AGC and or sync pulses occurs in at least one portion of an active or visible field. For example, the modification of AGC pulses during a portion of the visible or active field provides an advantage of improving playability artifact(s), such as darkening, and or time base stability of a display. Examples of modulation may include position, phase, amplitude, duration (e.g., pulse-width), pulse code, and or frequency modulation.

Accordingly, the present invention offers an alternative solution to clustering of AGC pulses on television lines, such as disclosed in the prior art U.S. Pat. No. 4,819,098 of previous mention, which relies on clustering of AGC pulses (preferably in an over-scan area outside the visible video field) to minimize playability effects on a television monitor or display.

In addition, the present invention improves on playbility for previous attempts (e.g., U.S. Pat. No. 4,163,253) to add back porch AGC pulses virtually every active field video line or (U.S. Pat. No. 4,819,098) to provide a 1/N line sequence for providing back porch pulses for AGC effects, which cause a playability problem on at least some television displays.

Further, the present invention improves playability (e.g., lowers darkening) of other prior art processes in which one out of three television lines is provided with AGC back porch or HBI pulses, which still causes some darkening effects on television sets. The darkening effects in some cases in the one out of three lines process causes a noticeable venetian blind effect on some television sets. (For example, other combinations such as 2 of 3 or p of q TV lines with AGC HBI pulses may be implemented for an embodiment of the invention. The number "p" for example >1. The TV lines with AGC pulses may follow a periodic or a periodic or preprogrammed sequence. Dissimilar AGC pulses may be included.)

In some television monitors, it is recommended that back porch pulses in the active field exceed a ratio of one out of every three television lines. Or a different combination of clustering of AGC pulses may be inserted in active field lines to result in acceptable playability on a display.

In a selected embodiment, the AGC pulses in the active television field are static, but in combination, modulated AGC pulses may be added to lines near and or within the vertical blanking interval. These modulated AGC pulses then, in combination with the static AGC pulses in the active field, cause a dynamic effect on an AGC system.

Also, color burst modifications, such as providing a high frequency signal in a back porch/HBI area of particular phase and or frequency, and or any enhancement copy protection signal or modification in a video signal such as for example, a lowered back or front porch portion, end of field/line waveform(s), sync modification, etc. as described in U.S. Pat. No. 5,583,936, may be used in combination with the active field AGC pulses.

An alternative embodiment of the present invention utilizes any of the active field AGC pulses as a content control command for conveying content control.

Furthermore the invention may include adaptive means or methods or apparatuses for modifying the AGC signals according to the actual program video signal.

The invention may provide more than one negative going pulse in an HBI for selected television lines. In an example of providing two or more negative going pulses in one of N lines, the negative going pulses will not significantly cause a time base error on a display. For example, providing two "sync-like" pulses every 10 lines will not cause the horizontal phase locked loop (H PLL) in a display to skew off erroneously, and thus an acceptable display of the video program still is produced. It is understood that each negative going pulse in the HBI may be followed by a positive going pulse (e.g., for an AGC effect).

An improvement in the prior art such as the '098 and '253 patents, is to include sync narrowing, parsing a horizontal sync pulse and or inserting/adding an AGC pulse away from the back porch region (e.g., with a ratio of one AGC pulse per N lines), and or shifting/modifying the horizontal sync pulses of the television lines that have no AGC pulses (e.g., (N−1) lines).

By way of example, if these (N−1) lines have shifted or delayed H syncs, the back porch sampling in a television set will occur later in the back porch region (for the one out of N lines with AGC pulses), thereby evading sampling of the inserted AGC pulses, thereby reducing playability artifact(s).

It should be known that the active or viewable pixels may be rescaled, shifted, and or truncated, to allow for television lines with the shifted or delayed H syncs, to provide a substantially "centered" picture on the TV display.

Other embodiments of the invention may include any waveform mentioned in the '936 patent, such as: providing a lowered portion in a front and/or back porch, or portion of a video signal; sync width modification (e.g., narrowing, widening, amplitude change, and or position); adding/inserting a 100 kHz to 5 MHz waveform to a portion of the video signal; or the use of FM, AM, PWM, and or PPM signals.

The present invention incorporates by reference the U.S. Pat No. 6,381,747 (Won for, et al.). For example, see FIGS. 1, 2, and 3 together with their (detailed) descriptions in the specification, along with TABLE 1 and TABLE 2 found in columns 11 and 12 of the patent.

It should be noted that any embodiments described previously or described in the following description, may be used in combination with other copy protection signals or modifications to video signals, such as: sync reduction; selected waveform(s) added to one or more portions of a video signal; pseudo syncs; pseudo sync/AGC pulse pairs; front porch or back porch modification; pedestal modification on selected television lines; color burst modification; luma and or chroma channel modification. Also any previously or later mentioned methods, modifications or r may be implemented in any combination of television standards (e.g., standard definition, progressive scan, interlaced scan, and or high definition).

BRIEF DESCRIPTION OF THE DRAWINGS

FIG. 1 is a waveform illustrating a normal horizontal sync (10) in a video signal with AGC pulses 12 shown in dotted lines to denote a prior art process (e.g., U.S. Pat. No. 4,163, 253). The dashed lines 14 depict consecutive video lines of the (program) video signal.

FIG. 2A is a waveform illustrating an embodiment of the invention wherein the AGC pulses vary in energy and or position from a particular line to another line. The embodiment of FIG. 2A may also include narrowed horizontal (H) sync pulses, for example, with or without the dissimilar AGC pulses for each line, so as to improve time base stability or playability in a display.

FIG. 2B is a waveform exemplifying amplitude changes in AGC pulses from one video line to another.

FIG. 3 is a waveform illustrating another embodiment which includes level shifting in a horizontal sync portion.

FIG. 12 is a block diagram illustrating apparatus of one or more embodiment of the invention FIG. 13 is a block diagram illustrating another apparatus of one or more embodiment of the invention.

FIG. 14 is a block diagram illustrating still another apparatus of one or more embodiment of the invention.

FIG. 15 is a block diagram illustrating another apparatus of one or more embodiment of the invention.

FIG. 16 is a block diagram illustrating at least part of a content control system utilizing one or more of the embodiments of the invention.

FIG. 17 is a block diagram illustrating an apparatus for implementing one or more different embodiments of the invention, and or other video signal modifications.

DETAILED DESCRIPTION

Figure 4:
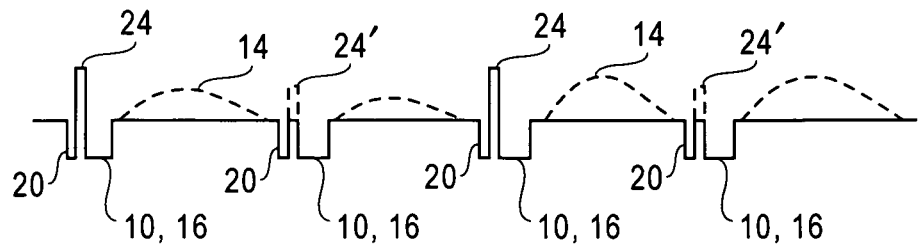
FIG. 4 is a waveform illustrating another embodiment with an added negative and positive pulse in selected horizontal blanking intervals.

FIG. 1 illustrates a video signal with a normal horizontal sync pulse 10 and including AGC pulses 12 shown in dotted lines to illustrate a prior art process such as disclosed in U.S. Pat. No. 4,163,253, or WO 2004/004346 A1. The latter process also requires narrowed H syncs. Consecutive lines have AGC pulses throughout the active field, which then cause a darkening effect on television monitors.

FIG. 2A shows a waveform with narrowed H syncs 16 combined with AGC pules 12 and AGC pulses 12' (shown in dotted line). In the invention depicted in FIG. 2A, AGC pulse 12 or 12' (but generally not both) may be set to a lower level/amplitude. For instance AGC pulse 12 may be set to a white level, and AGC pulse 12' may be set to gray level or may be set to black/blanking level. It is to be noted that the dissimilar AGC pulses 12 and 12' provided in the video signal define a basis of the invention. In addition, one or more narrowed H sync 16 may be changed to a normal or wider than normal sync pulse, and may be combined with dissimilar AGC pulses 12 and 12'. For example, providing a sequence of alternating AGC pulses of white and blanking levels over a portion of the active field results in reduced darkening effects when compared with the original process that includes AGC pulses of white levels throughout the active field (with narrowed H sync pulses). This example of alternating one AGC level with another AGC level (with narrowed H sync pulses) shows a reduced venetian blind effect when compared with the prior art. Note that other sequences of the AGC pulses of different energy levels (or position(s)) can result in better playability as well. In general, an embodiment of the invention includes narrowed horizontal syncs and 2 or more dissimilar AGC pulses (e.g., finite or zero energy AGC pulses may be used) in at least a portion of one or more active TV field. The AGC pulses may be provided in a periodic, a periodic, and or programmed sequence.

As previously discussed, an advantage of the invention is to provide improved playability and or reduced artifact(s) in a display when compared to prior art copy protection processes, by providing a first number of line(s) with a particular AGC signal, followed by a second number of line(s) with a different AGC signal or different amplitude positive going pulse, which can include an attenuated (or close to zero) AGC pulse. Note that the first and second number of video lines may be equal to each other, greater than each other, or less than each other. For example, if a first number equals R, and a second number equals S, then there are three possibilities; R=S, R>S, or R<S. It is apparent that more than two numbers may be used, e.g., R, S, T . . . etc.

FIG. 2A exemplifies an embodiment wherein 1 in 2 video lines has AGC pulses 12, with AGC pulses 12' of zero value disposed between pulses 12. But other numbers are possible such as 1 in N lines, or M1 AGC pulse per N lines, or the like. For example, two video lines of AGC pulses followed by one line with no AGC pulse may be used. Another example is to provide or synthesize a modulated number of AGC pulses, (positive going pulses), for example, in a portion of the active field and or VBI, wherein two or more AGC pulses have different energy (e.g., power or voltage or current, which can be finite or zero) and or position(s).

It should be noted that the number of lines of AGC pulses or zero amplitude AGC pulses may be replaced with an AGC pulse of a fixed energy level; for example, a lower/higher amplitude AGC pulse and or lower/higher duration AGC pulse.

FIG. 2B exemplifies an embodiment of the invention wherein a sequence of (three) video lines include AGC pulses of descending energy. In this example, for a first video line in a sequence, AGC pulse 12* has an amplitude of 100% white or 100 IRE. In a second line of a sequence, AGC pulse 12 has an amplitude of 50% white, which is followed by a third video line with an AGC pulse 12\*\*\*, which has an amplitude of 25% white. As seen on a fourth video line, the sequence repeats with AGC pulse 12\* (100% white). Other sequences (e.g., sequence of P or N video lines), amplitudes, pulse-widths, and or positions of the AGC pulse or positive going signal (in one or more horizontal blanking intervals) can be implemented or synthesized, for example, to provide a copy protection signal with improved playability or reduced darkening or reduced Venetian blind effect. Note that one or more (horizontal) sync pulses shown in FIG. 2**B may have narrowed, normal, or widened pulse-width.

FIGS. 3 and 4 illustrate similar techniques for providing dissimilar AGC pulses from one television line to another television line, but with a serrated sync pulse 18 per line as shown in FIG. 3, and with an extra negative going sync-like pulse 20 added in FIG. 4. Both FIGS. 3 and 4 add positive going (AGC) pulses 22 and 24, and or 22' and 24', located away from the back porch of the television signal. This minimizes sampling from the display device whereby the darkening effect is further reduced. To improve playability of the video signal in accordance with the invention, the AGC pulses 22' and 24' should be of less energy than AGC pulses 22 and 24, respectively.

Figure 5:
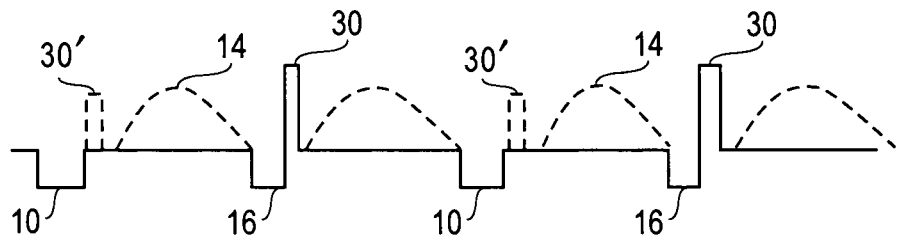
FIG. 5 is a waveform illustrating still another embodiment with horizontal sync pulses that are not similar from one television line to another, together with the inserted or added AGC pulses that are dissimilar from one line to another.
Figure 6:
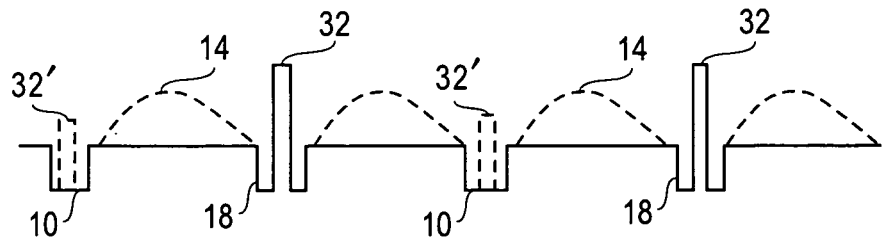
FIG. 6 is a waveform illustrating another embodiment that includes different sync pulses and or different level shifting pulses from one line to another.
Figure 7:
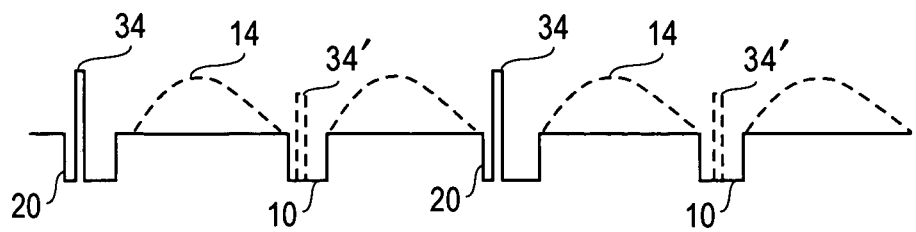
FIG. 7 is a waveform illustrating yet another embodiment of the invention, which is, for example, a variation of the waveform of FIG. 4.

In FIGS. 5, 6 and 7, some normal sync pulses 10 are provided, which technique may achieve sufficient time base playability when other sync pulses are not normal, such as sync pulses 16 (FIG. 2) 18 (FIG. 3) and 20 (FIG. 4). In other displays the normal sync pulses should be modified to minimize tearing. One solution for minimizing time base instability on a display is to apply the same type of sync pulses throughout a portion of the visible video field. For example, normal sync pulses 10 can be modified to sync pulses 16 of FIG. 2, to sync pulses 18 of FIG. 3, and or to sync pulses 20 of FIG. 4. Another solution for minimizing tearing is to adjust the position/width of the normal and or modified sync pulse(s).

It is noted that FIGS. 5, 6 and 7 illustrate alternative embodiments of the invention for improving playability (e.g., reducing darkening), for example, by purposely making the positive going (AGC) pulses 30', 32' and 34' less in amplitude and or pulse-width than pulses 30, 32, and 34, respectively, which may include a zero energy component. (Note that in FIG. 5, sync pulse 10 is typically wider than sync pulse 16.)

Figure 8:
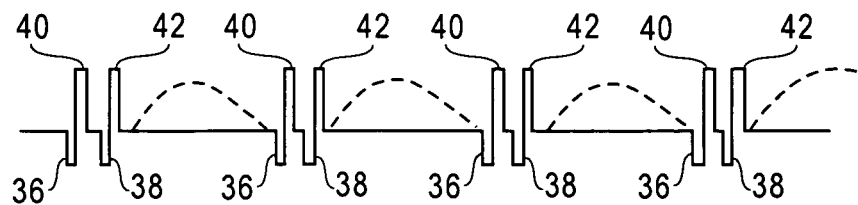
FIG. 8 is a waveform illustrating a prior art video signal.

FIG. 8 illustrates a prior art process whose playability can be improved by reducing the darkening caused by the process. In FIG. 8, there are two sync-like pulses 36 and 38, and two (equal) AGC pulses in substantially the horizontal blanking interval (and its vicinity). In accordance with the present invention, an improvement in playability in the process of FIG. 8 is achieved by dropping the energy level in all or selected AGC pulses 40 and/or 42, which then results in a process for reducing darkening in a display.

Figure 9:
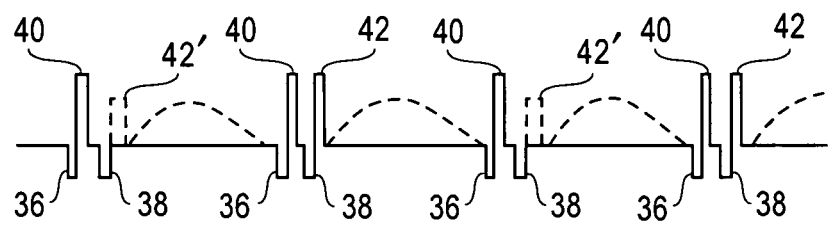
FIG. 9 is a waveform illustrating another embodiment with multiple sync-like pulses and AGC pulses.

FIG. 9 illustrates an example for modifying one or more AGC pulses in selected video lines for improving the playability over that of the prior art shown in FIG. 8. For example, in every N video lines, AGC pulse 42' replaces AGC pulse 42, with pulse 42'<42, energy-wise. Alternatively in every N lines, AGC pulse 40 may be replaced with an equivalent pulse 40' (not shown) such that AGC pulse 40'<pulse 40, energy-wise. It is to be understood that zero energy may be included in one or more of the AGC pulses 40' (not shown) or 42' (FIG. 10), and 40, 40', and or 42. In addition, the AGC pulses may be changed in position or in pulse duration/width (as part of the waveform(s) in FIGS. 9-11).

Figure 10:
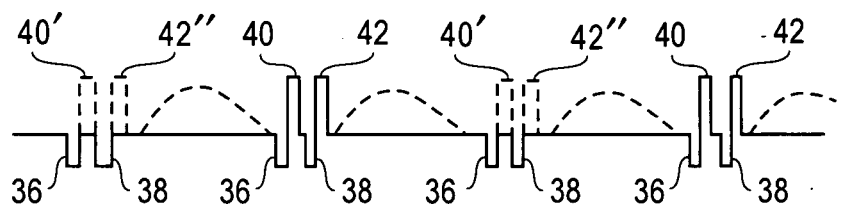
FIG. 10 is a waveform illustrating a further embodiment of the invention for improving playability.

FIG. 10 illustrates another example of modifying the prior art process of FIG. 8 for improving playability of the video signal. Here, in every N video lines, both positive going pulses are blanked or modified in energy level. For example, in every N lines, AGC pulses 40' and 42' are less in energy than AGC pulses 40 and 42, respectively, of FIGS. 8 and 10.

Figure 11:
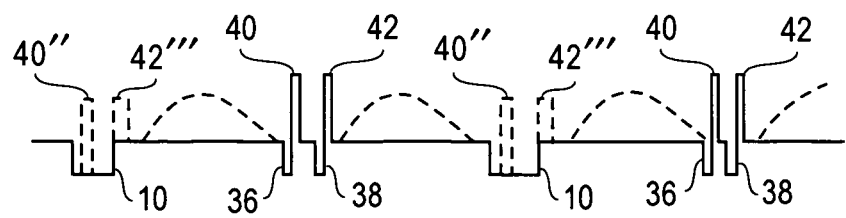
FIG. 11 is a waveform illustrating another embodiment of the invention for improving playability.

FIG. 11 illustrates another example of modifying the waveform of the prior art of FIG. 8 to improve playability of the video signal. To this end, selected lines which contain the two AGC pulses are replaced with sync pulses such as normal sync pulses 10 of the previous figures. FIG. 11 also illustrates that positive going pulses 40" and 42''' may be added. If for example, normal sync pulses 10 are inserted in selected lines, there is a possibility of some time base error (e.g., tearing) in some television sets. Adding the positive going pulse 40" with a positive level of at least half of a sync level will reduce tearing. Note that tearing may be reduced by adjusting the position and or width of the normal sync pulse 10 or by use of a modified sync pulse (e.g., a narrowed or widened sync, or a sync of changed position or amplitude).

FIG. 12 illustrates a device 50 such as a digital player, media player, cell phone, set top box (STB), receiver, TV set, wireless device, network device, computer, recorder, player, integrated circuit, and or the like, that can utilize any combination of the previously mentioned embodiments and or techniques to provide a content control command, or at least part of a copy protection signal. The device 50 may include control bits to program and or enable various signals and or alterations of the signals or waveforms described.

FIG. 13 illustrates a wireless receiver device 52 that may include circuitry that encodes or synthesizes any of the signals described previously.

FIG. 14 illustrates a device 54 that may include one or more input and one or more outputs, and including an RF output 2 for transmitting any of the signals mentioned. The device 54 may also provide another output 1 such as a video, digital, etc, output, that provides any of the signals mentioned.

FIG. 15 illustrates a device 56 that includes a receiver or tuner section 58, a reader 60 for reading or sensing control bit(s) and or any of the signals previously mentioned, such as the content control command and or at least part of a copy protection signal. Device 56 may include a generator 62 for providing any of the signals mentioned. Optionally, device 56 may include a recording device 64 and or a transmitting device.

The sensor/reader 60, which may be an embodiment of the invention, in device 56 may output a signal (whether used or not) indicative of the presence of any of the signals discussed above with respect to, for example, FIGS. 1-11. The sensor/reader 60 may sense or read multiple negative going pulses such as any shown in the FIGS. 3, 4, 6-11, and or any srrated vertical (or horizontal) sync pulse. The sensor/reader 60 may read AGC pulses, pseudo sync pulses, narrowed H sync pulses, modified vertical (V) sync pulses, color burst modification signals such as color stripe burst, split burst widened/narrowed burst envelopes, segmented phase/amplitude color burst envelopes, added cycles of a set phase, phase modulated color burst envelopes, frequency translated burst envelopes, and or amplitude modulated burst envelopes.

FIG. 16 illustrates a device 70 for generating a content control command. The device 70 includes a content control device 72 that preferably receives a signal from a reader or sensor circuit (such as sensor/reader 60 in device 56 of FIG. 15) and outputs a content control command. This command can modify a recorder, player, receiver, TV set, computer, cell phone, digital network digital camera, etc., for viewing, recording, transmitting functionality, and or for coupling to a modifier circuit 74. Modifier circuit 74 may take an input (video) signal to implement such as, for example, inserting or adding to the (video) signal any variation of signals mentioned previously. The modifier circuit 74 may include a modulator.

FIG. 17 illustrates a general apparatus for modifying a video signal. To this end, a processor circuit 80 has inputs or registers for supplying line and or pixel locations of the video signal. The output of processor circuit 80 then can provide or synthesize any variation of content control commands or part(s) of the copy protection signals previously mentioned. Processor circuit 80 may be controlled by control and or configuration bit(s). Processor circuit 80 may include (providing, generating, and or synthesizing) pseudo sync/AGC pulses, AGC pulses, lowered portion(s) of video (e.g., a lowered portion of front porch, back porch, and or active video line), and or color burst modification signals such as color stripe burst, split burst, widened/narrowed burst envelopes, segmented phase/amplitude color burst envelopes, added cycles of a set phase, phase modulated color burst envelopes, frequency translated burst envelopes, and or amplitude modulated burst envelopes (e.g., part of whole). Processor circuit 80 may include means for programing the sequence of the AGC pulses previously described and/or may program the sync width(s) and or position(s) in a video signal.

The features and advantages of the invention illustrated above in various embodiments may be summarized as follows:

The invention advantageously improves playability of a video copy protection signal, wherein the copy protection signal includes AGC pulses in video lines in a portion of the active or viewable video field or frame, and wherein the AGC pulses are comprised of non similar AGC signals from one video line to another video line. This improves playability on a television set by for example, reducing darkening or venetian blind darkening effect(s) in the video signal.

An embodiment of the invention programs non similar AGC signals in video lines of a portion of the video signal, including at least two of the non similar AGC signals in video lines residing in a visible or viewable portion of a television field or frame.

Another embodiment senses or reads non similar AGC signals in a portion of an active field or frame, wherein sensing or reading the non similar AGC pulses produces a signal that may be used as a content control command in a content control system.

The embodiments of the invention intend that one or more of the AGC signals may be deleted, blanked, and or attenuated.

In another embodiment, selected sync signals or sync pulses are reduced in pulse width and or in amplitude.

The invention advantageously reduces darkening effect(s) in a video display of a video signal, wherein the video signal includes back porch pulses of constant amplitude within a time interval indicative of an active video field portion, provides or synthesizes a content control signal, or a copy protection signal, by including back porch pulses of non similar pulse width, position, and or amplitude from one video line to another video line, wherein the content control signal or copy protection signal exhibit, the reduced darkening effects. The provided or synthesized content control signal or copy protection signal may include reduced AGC pulse width and or amplitude and or horizontal and or vertical sync pulses of reduced amplitude, or may include position modulated AGC pulse(s).

The embodiments of previous mention further contemplate one or more copy protection enhancement signal which is synthesized, provided or included in the video signal, content control signal, copy protection signal, and or provided video signal.

In addition, the embodiments of previous mention may include an added negative and or positive going pulse.

Another embodiment of the invention includes a process and apparatus for modulating the positive going pulses or AGC pulses, wherein the modulated positive going pulses and or AGC pulses may include any combination of amplitude, position, pulse code, frequency, pulse width, and or phase modulation.

The embodiments of previous mention may include negative pulses or sync or pseudo sync pulses in a portion of the active field which are added, inserted, widened, narrowed, and or positioned to reduce time base instability or tearing when the video signal is displayed on a monitor.

Another embodiment of the invention provides a content control signal, or at least part of a copy protection signal, to a video signal and includes adding or inserting a positive going pulse in selected horizontal intervals, wherein the selected horizontal intervals include narrowed or modified sync pulses, and further may include positive going pulses which vary in amplitude, phase, position, and or duration from one video line location to another video line location in at least a portion of the viewable area of the video field. In addition, a signal in the range of 100 kHz to 30 MHz may be added to a potion of the video signal. Further, the signal may be added to a portion of a vertical sync signal in a section or interval of the vertical blanking interval.

In a further embodiment, a signal is added for enhancing playability comprising at least one of the following: a modulated waveform that extends below a blanking level for a period of time, a lowered back porch signal, a lowered front porch signal, a dynamic gray to at least black signal, a blanking/black/gray/white level to below blanking level signal that is less negative than a sync tip level (e.g., less negative than sync tip level can a be level above a sync tip level).

The embodiments of previous mention may include the positive going pulse in a location prior to a color burst signal and/or in a short beginning of a back porch region such as, for example, within the first quarter or half of a back porch region.

The following U.S. patents are incorporated by reference herein: U.S. Pat. Nos. 4,819,098; 4,907,093; 5,315,448; 5,583,936; 5,784,523; 6,381,747; 6,516,132; 6,600,873; 6,836,549; 7,039,294; 7,050,698; 7,085,380; and 7,236,683.

It should be noted that any of the above incorporated patent methods/apparatuses may be combined with any part of the present invention. For example, a color stripe signal may be added to any AGC signal (e.g., as described in this application) for copy protection or content control. In another example, AGC and or pseudo sync pules are added in an over scan area (e.g., the VBI). A further example adds a waveform(s) to enhance effectiveness of a copy protection signal, under attenuated circumstance(s) of a video signal caused by an AGC effect (e.g., AGC pulses). Sync signal narrowing can also be applied to selected sync signals for enhancement of effectiveness.

It should be understood that any of the methods, signals, waveforms, modifications, processes, and or generators may be implemented in any combination of software, analog, and or digital. For example, any of the methods, signals, or apparatuses may be provided for devices such as DVD players, media players, set top boxes, cell phones, cameras, recorders, players, receivers, integrated circuit(s), and or tuners. Control bit(s) may also be used in controlling, enabling, disabling, and or configuring any of the signals or methods or apparatuses. A default condition may be included in any of the devices whereby the output of any of the devices may include any of the waveforms of previous description.

This disclosure is illustrative and not limiting. Further modifications will be apparent to one skilled in the art and are intended to fall within the scope of the appended claims.

What is claimed is:

1. A method of improving playability of a copy protected video signal by reducing venetian blind darkening effects in the video signal, wherein a copy protection signal includes automatic gain control (AGC) pulses in video lines in a portion of an active or viewable television field or frame, comprising:
    inserting or adding non similar AGC pulses from one video line to another video line, in a back porch region of the video lines in the active or viewable television field or frame, wherein the non similar AGC pulses are positive going pulses whose amplitudes are greater than zero IRE and change in IRE from one video line to a next video line; and
    wherein the inserting or adding improves playability in a television set by reducing venetian blind darkening effects when compared with adding back porch AGC pulses in 1/N lines or one our of every N lines in the active television field.

2. The method of claim 1 wherein one or more of the non similar AGC pulses are deleted, blanked and or attenuated.

3. The method of claim 1 wherein the video signal includes sync pulses the method including:
    reducing the pulse width and or amplitude of the sync pulses.

4. The method of claim 1 wherein the amplitudes of the non similar AGC pulses vary from about 25 IRE through about 100 IRE and are inserted or added in consecutive video lines.

5. The method of claim 1 wherein the amplitudes of the non similar AGC pulses vary from about 25 IRE through about 100 IRE and are inserted or added in other than consecutive video lines.

6. A method of reducing venetian blind darkening effects of a content control video signal in a video display to improve playability of the video signal, comprising:
    programming non similar automatic gain control (AGC) signals in selected video lines of a portion of the content control video signal, including at least two of the non similar AGC signals in video lines residing in a visible or viewable portion of a television field or frame; and
    wherein the non similar AGC pulses are positive going pulses in a back porch region of the video lines in an active television field or frame, and whose amplitudes are greater than zero IRE through 100 IRE and change in IRE from one video line to a next video line, and wherein adding the non similar AGC pulses whose amplitudes are greater than zero IRE reduce adding the non similar AGC pulses whose amplitudes are greater than zero IRE reduce venetian blind darkening effects when compared with AGC pulses added in 1/N lines or one out of every N lines in the visible or viewable portion of the active television field or frame.

7. The method of claim 6 wherein one or more of the non similar AGC pulses is deleted, blanked and or attenuated.

8. The method of claim 6 wherein the video signal includes sync pulses the method including:
    reducing the pulse width and or amplitude of the sync pulses.

9. The method of claim 6 further including:
    sensing or reading the non similar AGC pulses in a portion of the active television field or frame to produce a signal which comprises a content control command.

10. A method of providing a content control command, wherein a video signal contains non similar automatic gain control (AGC) signals from one video line to another, comprising:
    inserting or adding in a back porch region of the video lines in an active video field or frame the non similar AGC signals with amplitudes that vary from greater than zero IRE through about 100 IRE and change in IRE from one video line to a next video line; and
    sensing or reading the non similar AGC signals in a portion of the active video field or frame, wherein the sensing or reading of the AGC signals produces a signal that comprises the content control command, and wherein the non similar AGC signals reduce venetian blind darkening effects on a TV monitor when compared to adding AGC signals in the back porch region in 1/N lines or one out of every N lines in the active video field or frame.

11. The method of claim 10 wherein the AGC signals include one or more AGC signal which is deleted, blanked, and or attenuated.

12. The method of claim 10 wherein the video signal includes sync signals or pulses, further including:
    reducing the pulse-width and or amplitude of selected sync signals or sync pulses.

13. A method of reducing venetian blind darkening effects of a video signal in a video display to improve playability, wherein the video signal includes back porch pulses of constant amplitude in 1/N lines or one out of every N lines within a time interval indicative of an active field portion, comprising:
    providing or synthesizing a copy protection signal or a content control signal which includes back porch pulses of non similar pulse width and or amplitude from one video line to another video line;
    wherein the non similar back porch pulses are in the active field portion and are positive going pulses of greater than zero IRE amplitude and or greater than zero pulse width, which amplitude and or width changes from one video line to the next video line; and
    wherein the copy protection signal or content control signal produces the reduced venetian blind darkening effect in the video display when compared to the video signal that has back porch pulses included in 1/N lines in the active field portion.

14. The method of claim 13 wherein the provided or synthesized copy protection signal or content control signal includes horizontal and or vertical sync pulses of reduced pulse width and or reduced amplitude.

15. The method of claim 13 wherein one or more copy protection enhancement signal is synthesized or provided in the video signal, content control signal, or copy protection signal.

16. The method of claim 13, further including:
    level shifting selected horizontal sync pulses in the video signal.

17. The method of claim 13, further including:
    adding a negative and or positive going pulse to the video signal.

18. The method of claim 13, further including:
    adding positive going or automatic gain control (AGC) pulses to the video signal; and
    modulating the positive going pulses and AGC pulses.

19. The method of claim 18 wherein the modulated positive going pulses and or AGC pulses include any combination of amplitude, pulse code, frequency, pulse width, and or phase modulation.

20. The method of claim 13 wherein negative pulses or sync or pseudo sync pulses are added, inserted, widened, narrowed, and or positioned in a portion of the active field portion to reduce time base instability or tearing when the video signal is displayed on a monitor.

21. A method of providing a content control signal, or at least part of a copy protection signal for a video signal, comprising:

adding or inserting a positive going pulse in a video line back porch region in selected horizontal blanking intervals, wherein the selected horizontal blanking intervals include narrowed or modified sync pulses;

varying the amplitude, phase, position, and or duration of the positive going pulse from one video line location to another video line location to provide a non similar positive going pulse in the line locations in at least a portion of a viewable area of an active television field;

wherein the amplitude of the non similar positive going pulse in the hack porch region is greater than zero IRE to about 100 IRE and changes in IRE from one video line to a next video line, and wherein the non similar positive going pulse reduces venetian blind darkening effects on a TV monitor when compared to a content control signal or a copy protection signal, wherein the content control and copy protection signals have AGC pulses added to the back porch region in 1/N lines or one out of every N lines in the viewable area of the active television field.

22. The method of claim 21 wherein a signal in the range of 100 kHz to 30 MHz is added to a portion of the video signal.

23. The method of claim 22 wherein the signal is added to a portion of a vertical sync signal in a section or region of a vertical blanking interval.

24. The method of claim 21 wherein an enhancement signal comprising at least one of the following signals is added: a modulated waveform that extends below a blanking level for a period of time, a lowered back porch signal, a lowered front porch signal, a dynamic gray to at least black signal, a blanking/black level to below blanking level signal that is less than a sync level signal.

25. The method of claim 21, wherein the positive going pulse is located prior to a color burst signal and or is in a first quarter or half of a back porch region.

26. A method of improving playability of a copy protected video signal by reducing venetian blind darkening effects of the video signal, wherein a copy protection signal includes positive going pulses in video lines of a television field or frame, comprising:

providing non similar positive going pulses from one video line to another video line in an active television field or frame and in a back porch region of the video lines, to improve playability of the copy protected video signal in a television set; and wherein the non similar positive going pulses on different video lines have amplitudes greater than zero IRE through about 100 IRE and change in IRE from one video line to a next video line, and wherein the similar positive going pulses reduce venetian blind darkening effects on a TV monitor when compared to a content signals or a copy protection signal, wherein the content control and copy protection signals have AGC pulses added to the back porch region in 1/N lines or one out of every N lines in a viewable area of the active television field or frame.

27. The method of claim 26 wherein the amplitudes of the non similar positive going pulses vary from about 25 IRE through about 100 IRE and are provided in consecutive or nonconsecutive video lines.

28. The method of claim 26 wherein the step of providing includes:

varying the amplitude, phase, position and or duration of the positive going pulses from one video line location to another video line location.

29. The method of claim 26 wherein the positive going pulses are automatic gain control (AGC) pulses.

30. The method of claim 26 wherein the video signal includes sync pulses, the method including:

changing the amplitude and or pulse width of the sync pulses.

31. The method of claim 26 further including:

sensing or reading the non similar positive going pulses in a portion of the active television field or frame to produce a signal which comprises a content control command.

* * * * *

Disclaimer

8,526,794 B2 - Ronald Quan, Cupertino, CA (US). METHOD AND APPARATUS FOR SYNTHESIZING A COPY PROTECTION OR CONTENT CONTROL SIGNAL WITH IMPROVED PLAYABILITY OF A TV SET. Patent dated September 3, 2013. Disclaimer filed December 30, 2021, by the assignee, Rovi Solutions Corporation.

The term of this patent shall not extend beyond the expiration date of December 31, 2021.

*(Official Gazette, June 21, 2022)*